US012751484B2

(12) United States Patent
Richardson et al.

(10) Patent No.: US 12,751,484 B2
(45) Date of Patent: Oct. 6, 2026

(54) CONSUMABLE FOR USE WITH A NON-COMBUSTIBLE AEROSOL PROVISION DEVICE

(71) Applicant: Nicoventures Trading Limited, London (GB)

(72) Inventors: John Richardson, London (GB); Will England, London (GB); Andrew Bray, London (GB)

(73) Assignee: NICOVENTURES TRADING LIMITED, London (GB)

( * ) Notice: Subject to any disclaimer, the term of this patent is extended or adjusted under 35 U.S.C. 154(b) by 332 days.

(21) Appl. No.: 18/294,725

(22) PCT Filed: Aug. 4, 2022

(86) PCT No.: PCT/EP2022/072013
§ 371 (c)(1),
(2) Date: Feb. 2, 2024

(87) PCT Pub. No.: WO2023/012307
PCT Pub. Date: Feb. 9, 2023

(65) Prior Publication Data

US 2024/0334967 A1 Oct. 10, 2024

(30) Foreign Application Priority Data

Aug. 4, 2021 (GB) ..................................... 2111269

(51) Int. Cl.
*A24F 40/20* (2020.01)
*A24C 5/01* (2020.01)
(Continued)

(52) U.S. Cl.
CPC .................. *A24D 1/20* (2020.01); *A24C 5/01* (2020.01); *A24D 1/008* (2013.01); *A24F 40/20* (2020.01); *A24F 40/465* (2020.01); *H05B 6/108* (2013.01)

(58) Field of Classification Search
None
See application file for complete search history.

(56) References Cited

U.S. PATENT DOCUMENTS

2017/0318862 A1 11/2017 Mironov et al.
2018/0116285 A1 5/2018 Polloni et al.
(Continued)

FOREIGN PATENT DOCUMENTS

CN 107427086 A 12/2017
CN 110403233 A 11/2019
(Continued)

OTHER PUBLICATIONS

International Search Report and Written Opinion issued in PCT Application No. PCT/EP2022/072013, mailed Dec. 7, 2022, 12 pages.

*Primary Examiner* — Cynthia Szewczyk
(74) *Attorney, Agent, or Firm* — WOMBLE BOND DICKINSON (US) LLP

(57) ABSTRACT

The present invention relates to a consumable (100) for use with a non-combustible aerosol provision device; a non-combustible aerosol provision system comprising a non-combustible aerosol provision device and the consumable; and a kit comprising a non-combustible aerosol provision device and the consumable. The consumable comprises a support (101) and aerosol generating material (104), the support has at least one other portion by a bare area of surface of the support; at least two discrete portions of the aerosol generating material are upstanding from the respective surface of the support upon which they are supported;
(Continued)

the support is configured by the shape of at least one curved face and/or by folding about a fold line (106) between two faces so that at least one part of a first surface of the support faces toward at least a part of the same or another surface of the support; the discrete portions of aerosol generating material are so located on the surface(s) of the support that, each discrete portion of aerosol generating material upstanding from the surface of the support falls into a bare area of the surface of the support between or adjacent to portions of aerosol generating material.

20 Claims, 4 Drawing Sheets

(51) Int. Cl.

| | |
|---|---|
| ***A24D 1/00*** | (2020.01) |
| ***A24D 1/20*** | (2020.01) |
| ***A24F 40/465*** | (2020.01) |
| ***H05B 6/10*** | (2006.01) |

(56) References Cited

U.S. PATENT DOCUMENTS

| | | | | |
|---|---|---|---|---|
| 2020/0120981 | A1 | 4/2020 | Yamada | |
| 2023/0180821 | A1 * | 6/2023 | Bray | A24D 1/00 131/337 |

FOREIGN PATENT DOCUMENTS

| | | | |
|---|---|---|---|
| WO | 2016/120344 | A2 | 8/2016 |
| WO | 2017/167932 | A1 | 10/2017 |
| WO | 2021105473 | A1 | 6/2021 |

* cited by examiner

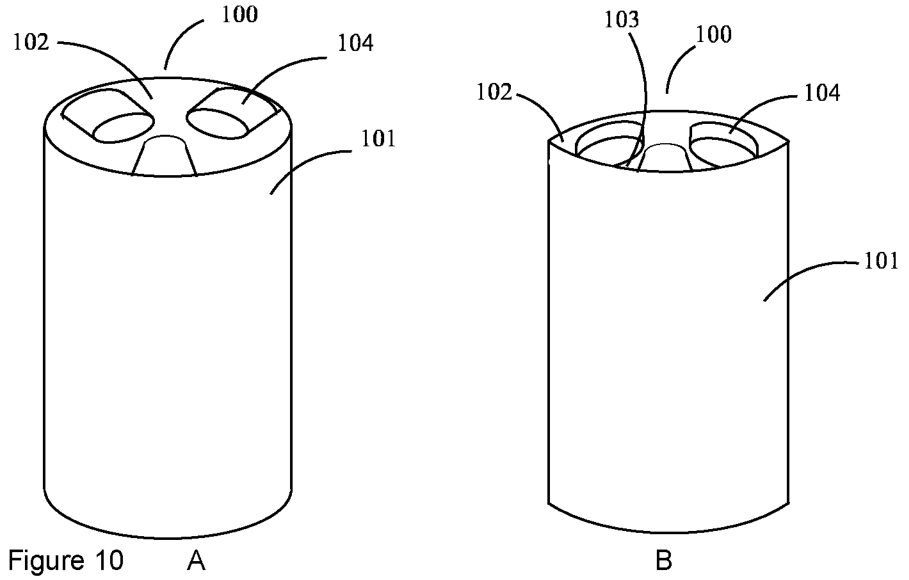
Figure 10 A B
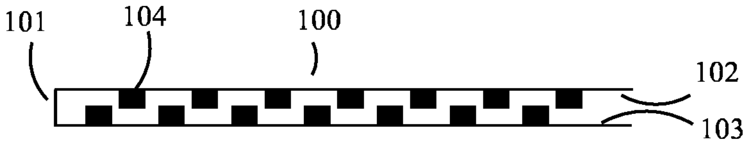
Figure 11
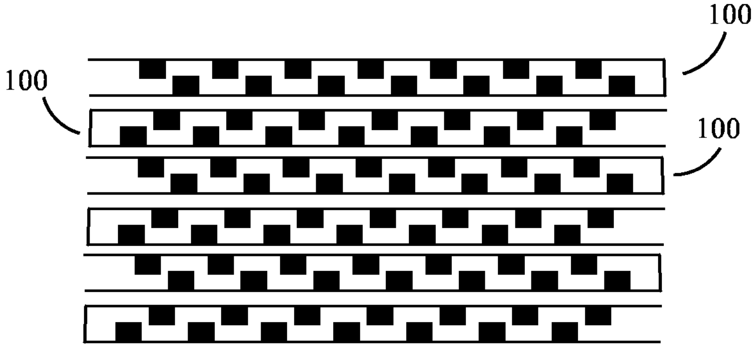
Figure 12
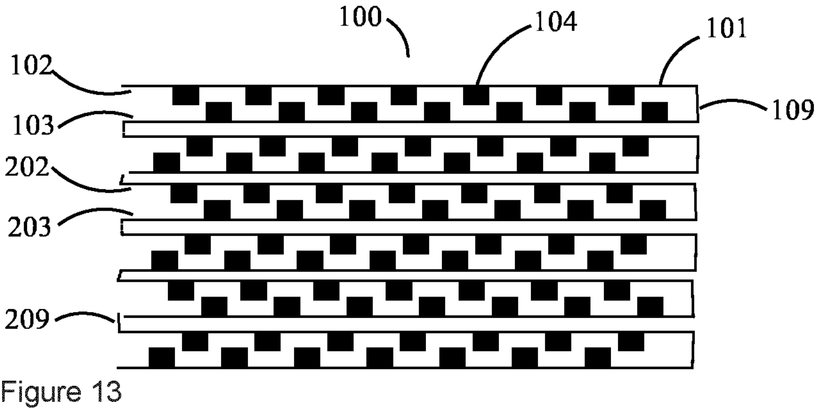
Figure 13

CONSUMABLE FOR USE WITH A NON-COMBUSTIBLE AEROSOL PROVISION DEVICE

CROSS-REFERENCE TO RELATED APPLICATIONS

This application is a national stage application filed under 35 U.S.C. 371 of International Application No. PCT/EP2022/072013, filed Aug. 4, 2022, which claims priority to, and the benefit of, Patent Application No. GB 2111269.3, filed Aug. 4, 2021, each of which is incorporated herein in its entirety by reference.

TECHNICAL FIELD

The present invention relates to a consumable for use with a non-combustible aerosol provision device.

BACKGROUND

Smoking articles such as cigarettes, cigars and the like burn tobacco during use to create tobacco smoke. Alternatives to these types of articles release an inhalable aerosol or vapour by releasing compounds from a substrate material by heating without burning. These may be referred to as non-combustible smoking articles or aerosol generating assemblies.

One example of such a product is a heating device which release compounds by heating, but not burning, a solid aerosol-generating material. This solid aerosol-generating material may, in some cases, contain a tobacco material. The heating volatilises at least one component of the material, typically forming an inhalable aerosol. These products may be referred to as heat-not-burn devices, tobacco heating devices or tobacco heating products. Various different arrangements for volatilising at least one component of the solid aerosol-generating material are known. Certain examples of these products utilise a consumable article which is brought into contact with the heating device. The consumable may contain the aerosol-generating material.

As another example, there are hybrid devices. These hybrid devices contain a liquid source (which may or may not contain nicotine) which is vaporised by heating to produce an inhalable vapour or aerosol. The device additionally contains a solid aerosol-generating material (which may or may not contain a tobacco material) and components of this material are entrained in the inhalable vapour or aerosol to produce the inhaled medium.

SUMMARY

In accordance with some embodiments described herein, there is provided a consumable for use with a non-combustible aerosol provision device (e.g. an apparatus for heating an aerosol generating material to volatilise at least one component of the aerosol generating material), in which the consumable comprises a support and aerosol generating material, the support has at least one curved or at least two substantially flat surface(s) wherein:

the aerosol generating material comprises two or more or discrete portions of aerosol generating material each supported on at least one surface of the support and with each of the portions separated from at least one other portion by a bare area of surface of the support;

at least two discrete portions of the aerosol generating material are upstanding from the respective surface of the support upon which they are supported;

the support is configured by the shape of at least one curved face and/or by folding about a fold line between two faces so that at least one part of a first surface of the support faces toward at least a part of the same or another surface of the support;

the discrete portions of aerosol generating material are so located on the surface(s) of the support that, each discrete portion of aerosol generating material upstanding from the surface of the support falls into a bare area of the surface of the support between or adjacent to portions of aerosol generating material.

In one particular embodiment is provided a consumable for use with an apparatus for heating aerosol generating material to volatilise at least one component of the aerosol generating material (a non-combustible aerosol provision device), in which the consumable comprises a support and aerosol generating material, the support has a first and second surface separated by at least one fold line, in which:

the aerosol generating material comprises two or more or discrete portions of aerosol generating material with at least one portion supported on each of the first surface and the second surface and with each of the portions separated from at least one other portion by a bare area of the first surface and/or second surface of the support;

each discrete portion of the aerosol generating material is upstanding from the respective first surface or second surface of the support upon which it is supported with each discrete portion having a first face, the first face being the part of the portion furthest from the section of the first surface or second surface upon which it is supported;

the support comprises at least one fold line;

the support is foldable about the fold line so that the first surface on one side of the fold line may face toward the second surface on the other side of the fold line;

the discrete portions of aerosol generating material are so located on the first surface of the support that, when the support is folded about the fold line, the first face of each discrete portion of aerosol generating material abuts or is proximal to a bare area of the second surface of the support; and the discrete portions of aerosol generating material are so located on the second surface of the support that, when the support is folded about the fold line, the first face of each discrete portion of aerosol generating material abuts or is proximal to a bare area of the first surface of the support.

Such a consumable may allow for easier handling and/or use of the consumable. Such a consumable may further allow for easier packing, storage, manufacture and/or use of the consumable since the consumables may be manufactured, transported and stored in a flat configuration and subsequently folded for use. Alternatively, the consumable may be folded for transportation and/or storage such that the aerosol generating material is protected between the folded layers of the support material. The consumable may then be unfolded or folded in an alternative configuration for use.

Furthermore, an arrangement of discrete portions of aerosol generating material separated by bare areas of support may allow for improved processes such as drying during manufacture. The configuration of the consumable to allow "interdigitation" of separate portions of aerosol generating material from opposing surfaces or opposing regions of the same surface then allows for a high density of separate portions of aerosol generating material in the final configuration of the consumable.

In an exemplary embodiment, the support comprises a first edge and a second edge and in bending the consumable in to a curve and/or folding the consumable about at least one fold line the first and second edges are brought adjacent. The consumable may comprise means to latch the first and second edges of the support when the support is in a folded configuration.

The bringing together of two edges of the support (e.g. by folding or rolling) may serve to define at least two openings between which at least one passageway is formed. Such at least one passageway may be at least partially defined by the spaces between adjacent discrete portions of aerosol generating material. Thus, in appropriate embodiments, adjacent discrete portions of aerosol generating material may define at least one passageway between the at least two openings.

In a further exemplary embodiment, the consumable may comprise a susceptor formed, for example, from a sheet of material such as a metal foil. This allows for heating of at least one region of the consumable by means of electrical induction.

In accordance with some embodiments described herein, there is provided a system comprising a non-combustible aerosol provision device (e.g. an apparatus for heating aerosol generating material to volatilise at least one component of the aerosol generating material); and a consumable for use with the non-combustible aerosol provision device. The consumable may be as defined herein, such as wherein the consumable comprises a support and aerosol generating material, the support has at least one curved or at least two substantially flat surface(s) wherein:

- the aerosol generating material comprises two or more or discrete portions of aerosol generating material each supported on at least one surface of the support and with each of the portions separated from at least one other portion by a bare area of surface of the support;
- at least two discrete portions of the aerosol generating material are upstanding from the respective surface of the support upon which they are supported;
- the support is configured by the shape of at least one curved face and/or by folding about a fold line between two faces so that at least one part of a first surface of the support faces toward at least a part of the same or another surface of the support;
- the discrete portions of aerosol generating material are so located on the surface(s) of the support that, each discrete portion of aerosol generating material upstanding from the surface of the support falls into a bare area of the surface of the support between or adjacent to portions of aerosol generating material.

Alternatively, the consumable may comprise a support and aerosol generating material, the support having a first and second surface separated by at least one fold line, in which:

- the aerosol generating material comprises two or more or discrete portions of aerosol generating material with at least one portion supported on each of the first surface and the second surface and with each of the portions separated from at least one other portion by a bare area of the first surface and/or second surface of the support;
- each discrete portion of the aerosol generating material is upstanding from the respective first surface or second surface of the support upon which it is supported with each discrete portion having a first face, the first face being the part of the portion furthest from the section of the first surface or second surface upon which it is supported;
- the support comprises at least one fold line;
- the support is foldable about the fold line so that the first surface on one side of the fold line may face toward the second surface on the other side of the fold line;
- the discrete portions of aerosol generating material are so located on the first surface of the support that, when the support is folded about the fold line, the first face of each discrete portion of aerosol generating material abuts or is proximal to a bare area of the second surface of the support; and
- the discrete portions of aerosol generating material are so located on the second surface of the support that, when the support is folded about the fold line, the first face of each discrete portion of aerosol generating material abuts or is proximal to a bare area of the first surface of the support.

In accordance with some embodiments described herein, there is provided a kit comprising a non-combustible aerosol provision device (e.g. an apparatus for heating aerosol generating material to volatilise at least one component of the aerosol generating material); and a consumable for use with the non-combustible aerosol provision device, in which the consumable is as described or claimed herein. The consumable may comprise a support and aerosol generating material, the support has at least one curved or at least two substantially flat surface(s) wherein:

- the aerosol generating material comprises two or more or discrete portions of aerosol generating material each supported on at least one surface of the support and with each of the portions separated from at least one other portion by a bare area of surface of the support;
- at least two discrete portions of the aerosol generating material are upstanding from the respective surface of the support upon which they are supported;
- the support is configured by the shape of at least one curved face and/or by folding about a fold line between two faces so that at least one part of a first surface of the support faces toward at least a part of the same or another surface of the support;
- the discrete portions of aerosol generating material are so located on the surface(s) of the support that, each discrete portion of aerosol generating material upstanding from the surface of the support falls into a bare area of the surface of the support between or adjacent to portions of aerosol generating material.

In a related embodiment, the consumable comprises a support and aerosol generating material, the support has a first and second surface separated by at least one fold line, in which:

- the aerosol generating material comprises two or more or discrete portions of aerosol generating material with at least one portion supported on each of the first surface and the second surface and with each of the portions separated from at least one other portion by a bare area of the first surface and/or second surface of the support;
- each discrete portion of the aerosol generating material is upstanding from the respective first surface or second surface of the support upon which it is supported with each discrete portion having a first face, the first face being the part of the portion furthest from the section of the first surface or second surface upon which it is supported;

the support comprises at least one fold line;

the support is foldable about the fold line so that the first surface on one side of the fold line may face toward the second surface on the other side of the fold line;

the discrete portions of aerosol generating material are so located on the first surface of the support that, when the support is folded about the fold line, the first face of each discrete portion of aerosol generating material abuts or is proximal to a bare area of the second surface of the support; and the discrete portions of aerosol generating material are so located on the second surface of the support that, when the support is folded about the fold line, the first face of each discrete portion of aerosol generating material abuts or is proximal to a bare area of the first surface of the support.

In accordance with some embodiments described herein, there is provided a method of manufacturing a consumable for use with a non-combustible aerosol provision device (e.g. an apparatus for heating aerosol generating material to volatilise at least one component of the aerosol generating material), the method comprising:

providing a support having at least one curved or at least two substantially flat surfaces, providing at least two discrete portions of aerosol generating material with each supported on at least one surface of the support and with each of the portions separated from at least one other portion by a bare area of surface of the support, where at least two portions of the aerosol generating material are upstanding from the respective surface of the support upon which they are supported, the portions of aerosol generating material being applied in locations on the support such that each discrete portion of aerosol generating material upstanding from the support extends into a bare area of the surface of the support between or adjacent to portions of aerosol generating material.

One embodiment of such a method is a method comprising providing a support having at least a first surface, and a second surface separated by a fold line, providing at least two discrete portions of aerosol generating material with at least one portion supported on each of the first and second surfaces with each of the portions separated from at least one other portion by a bare area of the respective surface where each discrete portion of the aerosol generating material is upstanding from the respective first surface or second surface of the support upon which it is supported with each discrete portion having a first face, the first face being the part of the portion furthest from the section of the first surface or second surface upon which it is supported, the portions of aerosol generating material being applied in locations on the support such that when the support is folded about the fold line so that the first surface on one side of the fold line may face toward the second surface on the other side of the fold line, the first face of each discrete portion of aerosol generating material supported on the first surface abuts or is proximal to a bare area of the second surface of the support; and the first face of each discrete portion of aerosol generating material supported on the second surface of the support abuts or is proximal to a bare area of the first surface of the support.

BRIEF DESCRIPTION OF THE DRAWINGS

Embodiments of the invention will now be described, by way of example only, with reference to the accompanying drawings, in which:

FIG. 10 shows a schematic view of two alternative consumables for use with a non-combustible aerosol provision device where the consumables have at least one curved surface. The consumable in FIG. 10A is in the form of a tube of circular cross-section having a single inside surface. The consumable of FIG. 10B is in the form of a squashed or folded tube having two inside surfaces separated by fold lines.

FIG. 11 shows a schematic cross-section view of a consumable wherein the consumable is folded to protect the portions of aerosol generating material during storage.

FIG. 12 shows a schematic cross-section of a stack of the consumables of FIG. 11. Since each item has the portions of aerosol generating material folded together, they can be stacked without the aerosol generating material becoming contaminated or sticking undesirably to other consumables, or the surroundings.

FIG. 13 shows a schematic cross-section of a consumable having multiple layers stacked such that the portions of aerosol generating material interdigitate as described herein. The consumable shown includes multiple frangible regions (109, 209) allowing a part to be torn or broken away for use.

DETAILED DESCRIPTION

Figure 1:
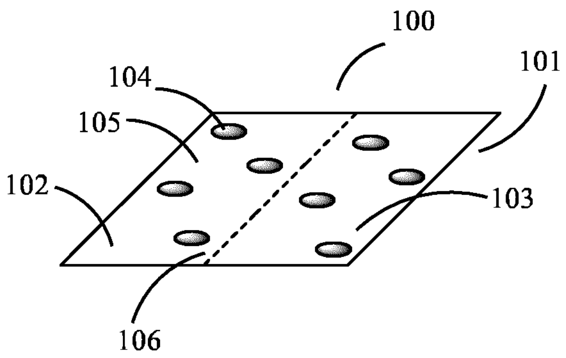
FIG. 1 shows a schematic perspective view of a consumable for use with a non-combustible aerosol provision device where the consumable is in an unfolded configuration.

As used herein, the term "aerosol generating material" includes materials that provide volatilised components upon heating. "Aerosol generating material" includes any tobacco-containing material and may, for example, include one or more of tobacco, tobacco derivatives including tobacco extracts, expanded tobacco, reconstituted tobacco or tobacco substitutes. "Aerosol generating material" may also include other, non-tobacco, products, including for example flavourants, which, depending on the product, may or may not contain nicotine, filler materials such as chalk and/or sorbent materials, glycerol, propylene glycol or triacetin. The aerosol generating material may also include a binding material, which may be a gelling material, for example, sodium alginate. The aerosol generating material may include tobacco consumables or leaves in solid form within the material. In one example the aerosol generating material is an aerosol generating gel. The aerosol generating gel may be a solid, jelly like material. The aerosol generating gel may be a newtonian or non-newtonian gel. In one example the gel is a thermoplastic gel.

The aerosol-generating material may comprise or be in the form of an aerosol-generating film. The aerosol-generating film may comprise a binder, such as a gelling agent, and an aerosol former. Optionally, a substance to be delivered and/or filler may also be present. The aerosol-generating film may be substantially free from botanical material. In particular, in some embodiments, the aerosol-generating material is substantially tobacco free.

The aerosol-generating film may have a thickness of about 0.015 mm to about 1 mm. For example, the thickness may be in the range of about 0.05 mm, 0.1 mm or 0.15 mm to about 0.5 mm or 0.3 mm.

The aerosol-generating film may be continuous. For example, the film may comprise or be a continuous film of material supported on a support.

The aerosol-generating film may be discontinuous. For example, the aerosol-generating film may comprise one or more discrete portions or regions of aerosol-generating material, such as dots, stripes or lines, which may be supported on a support.

In such embodiments, the support is planar or non-planar.

The aerosol-generating film may be formed by combining a binder, such as a gelling agent, with a solvent, such as water, an aerosol-former and one or more other components, such as one or more substances to be delivered, to form a slurry and then heating the slurry to volatilise at least some of the solvent to form the aerosol-generating film.

The slurry may be heated to remove at least about 60 wt %, 70 wt %, 80 wt %, 85 wt % or 90 wt % of the solvent.

The aerosol-generating material may comprise or be an "amorphous solid". In some embodiments, the aerosol-generating material comprises an aerosol-generating film that is an amorphous solid. The amorphous solid may be a "monolithic solid". The amorphous solid may be substantially non-fibrous. In some embodiments, the amorphous solid may be a dried gel. The amorphous solid is a solid material that may retain some fluid, such as liquid, within it. In some embodiments, the amorphous solid may, for example, comprise from about 0 wt %, 5 wt % or 10 wt % of liquid, to about 30 wt %, 40 wt % or 50 wt % of liquid.

The amorphous solid may be substantially free from botanical material. The amorphous solid may be substantially tobacco free.

One example of an aerosol generating material is an amorphous solid such as a gel or dried gel. Such a material may be formed from a mixture of a gelling material, an aerosol forming material and optionally an active constituent and/or a flavourant. The mixture may be formed as a slurry and applied to at least one surface of the support (e.g. to a support layer). Such a slurry may then be gelled (e.g. with a setting agent) and the thus-formed gel may optionally be dried or partially dried (e.g. to form an aerosol generating film).

Typical gelling agents which may be used in forming certain gel embodiments of aerosol generating materials include at least one gelling agent selected from alginates, pectins, hydroxyethyl cellulose, hydroxypropyl cellulose, carboxymethylcellulose, pullulan, xanthan gum guar gum, carrageenan, agarose, acacia gum, fumed silica, PDMS, sodium silicate, kaolin and polyvinyl alcohol. Such gelling agents may be used in combination with appropriate setting (e.g. cross-linking) agents. For example, alginates and/or pectins may be crosslinked by calcium ions. In certain embodiments of the invention, the gelling agent may be at least one alginate and/or at least one pectin crosslinked by calcium ions.

An example of gelling agents which may be used in forming an aerosol generating material are alginate salts. Alginate salts are polysaccharides derived from alginic acid and are typically high molecular weight polymers (10-600 kDa). Alginic acid is a copolymer of β-D-mannuronic (M) and α-L-guluronic acid (G) units (blocks) linked together with (1,4)-glycosidic bonds. On addition of calcium cations, the alginate crosslinks to form a gel. In some embodiments, the gelling agent may comprise or consist of an alginate salt in which at least about 40%, 45%, 50%, 55%, 60% or 70% of the monomer units in the alginate copolymer are α-L-guluronic acid (G) units. Where the gelling agent comprises at least one alginate, a setting agent comprising calcium ions may be used. Gels comprising alginates may be dried to for films of aerosol generating material. Such films may be in the form of amorphous solids as described herein.

Aerosol generating materials may comprise an active constituent. Suitable active constituents include those described herein. Examples of such active constituents include tobacco, tobacco material (e.g. tobacco extract) and/or nicotine. Nicotine may be present in the aerosol generating materials, with or without the presence of tobacco or tobacco extract.

Aerosol generating materials may comprise a flavouring constituent. Suitable flavouring constituents include those described herein. The flavour may, for example, comprise one or more mint-flavours, suitably a mint oil from any species of the genus *Mentha*. The flavour may suitably comprise, consist essentially of or consist of menthol. Other flavours may be used, including those disclosed herein.

In certain embodiments, the consumable may comprise at least two different compositions of aerosol generating materials. Where this is the case, each aerosol generating material may be different from other compositions present by at least one difference selected from; comprising a different flavour, comprising a different total content of flavour, comprising a different concentration of flavour, comprising a different active constituent, comprising a different total content of active constituent, comprising a different concentration of active constituent and any combination of such differences.

In certain embodiments, the consumable may comprise at least two different compositions of aerosol generating materials. Where this is the case, the discrete portions of each aerosol generating material composition may be distinguished by at least one visual difference. For example, each composition of aerosol generating material may be shaped or coloured in a manner distinctive to that composition or that portion. This may be an arbitrary shape or colour or one chosen to be suggestive of the flavour, active ingredient, active ingredient content or heating duration of that composition or portion. Thus, the shape and/or colour of a discrete portion may be indicative of the composition or amount of aerosol generating material in that portion.

In certain embodiments, the consumable may comprise a support formed of at least one support material having at least one surface wherein an aerosol generating material, such as an aerosol generating gel or film, is deposited on one or more portions or "regions" of said surface. In certain embodiments, the region or regions of said surface upon which the aerosol generating material is present may each be surrounded by a portion of said surface having no aerosol generating material present. Thus, the or each portion or region of said surface upon which aerosol generating material is present may be surrounded or "framed" by a region where aerosol generating material is absent or substantially absent. Each region of aerosol generating material may thus form a discrete portion of aerosol generating material.

In certain embodiments, the consumable may comprise a support formed of at least one support material having at least one surface wherein an aerosol generating material, such as an aerosol generating gel or film, is deposited on one or more portions or "regions" of said surface. In certain embodiments, a plurality of regions of aerosol generating material will be present on said surface.

In certain embodiments, the support may be shaped such that it can be folded at least once (and may optionally be provided with at least one fold line) to give a first surface and a second surface either side of the fold. Such folding will bring portions of aerosol generating material attached to the second surface into the proximity of bare areas of the first surface between portions of aerosol generating material supported on the first surface. Correspondingly portions of aerosol generating material supported on the first surface will be brought into the proximity of bare areas of the second surface between portions of aerosol generating material attached to the second surface. In such a folded embodiment, the surfaces of the support may be flat or curved.

In certain embodiments, the support may be shaped such that it has at least one curved surface which can be rolled or folded at least once such that a part of the surface or the support faces towards the same or a different surface of the support. A rolled support may be in the form, for example, of a tube with circular or elliptical cross-section such that one part of the surface faces towards another part of that same (curved) surface. The support may, however, be folded with curved surfaces such as in a tube with digonal cross-section. Where the support comprises at least one curved surface, the curvature of the surface and/or any folding will bring portions of the aerosol generating material attached to a first surface into proximity with bare areas of the same or another surface of the support between portions of aerosol generating material supported on that surface.

Folding and/or rolling the support as described herein may allow for ease of storage, transportation and/or use of the consumable. For example, folding such that portions of aerosol generating material on one face of the support fall into bare areas between portions of aerosol generating material on a second face of the support may serve to protect the aerosol generating material from contamination or contact with other materials during transportation and/or storage since the aerosol generating material supported on each of the "inside" surfaces of the folded support is protected by the support itself. Such a consumable may be used in its folded or rolled configuration, partially unfolded/unrolled or fully unfolded/unrolled for use.

In certain embodiments, the support may be folded to form a consumable which can be torn, broken or otherwise divided into sections for use. Such division may be aided by provision of a frangible region in the support, such as a line of perforations or a score-line. The frangible region may also act as a fold-line in the support.

By providing frangible regions along fold lines in the support, a multi-use consumable may be provided where each section of the consumable may be protected by support material.

A suitable configuration for such a multi-use consumable would include "fan-folded" where the support is folded back on itself in alternate directions. This brings two surfaces of the support together with the aerosol generating material "inside" as described above. The following two folds then generate a similar configuration with aerosol generating materials on the "inside" surfaces protected by the support folded around them on the "outside" surfaces. Frangible regions may then be provided at every fold line or at every alternate fold line such that a section of the consumable may be removed for use. One arrangement of this type is illustrated in the attached Figures.

In certain embodiments, at least two different aerosol generating materials will be present, each aerosol generating material being present in at least one region separate from any region containing other aerosol generating material(s). Thus, at least two aerosol generating materials having different compositions may be present as different discrete portions of aerosol generating material. Each separate composition of aerosol generating material may be present in more than one discrete portion (e.g. in different regions of a surface).

Where more than one composition of aerosol generating material is present and each composition is present in more than one discrete portion, each composition of aerosol generating material may be arranged in a regular or systematic arrangement of portions. Such arrangements may include strips, blocks or regions of a single composition or alternating or sequential arrangements of different compositions in one or two dimensions. The discrete portions of aerosol generating material may be so positioned that certain portions containing the same composition may be distant from each other in the flat configuration but become adjacent in the folded configuration.

In certain embodiments, the consumable may comprise a support formed of at least one support material having at least one surface wherein an aerosol generating material, such as an aerosol generating gel or film, is deposited on one or more portions or "regions" of said surface. In certain embodiments, the shape of the regions upon which aerosol generating material is present may be controlled. In certain embodiments, each region will be the same or substantially the same shape and size as the other regions. In an alternative embodiment, the regions of aerosol generating material may be of different sizes. This may allow a choice of user experience by selective heating of specific regions.

In certain embodiments, the overall shape and dimensions of the consumable item will be selected to correspond to the appropriate portion of at least one design of heating device. Thus, the consumable may be adapted to removably fit on, into and/or around at least one portion of at least one heating device. In certain embodiments, the overall outer shape (outer perimeter) of the consumable may be, or substantially be, a regular polygon or other shape with rotational symmetry. This may allow the consumable to be positioned on, in, against and/or around the heating device in a plurality of orientations, which may allow selective heating of certain portions or regions of aerosol generating material.

In certain embodiments, the overall outer perimeter of the consumable may be circular, or substantially circular, in at least one dimension. In certain embodiments, the overall outer shape of the consumable may have a circular or substantially circular cross-section in at least one plane.

In certain embodiments, the overall outer perimeter of the consumable may be non-circular, (and not substantially circular). In certain embodiments, the overall outer shape of the consumable may have a non-circular cross-section. Examples of non-circular outer perimeters include substantially square or rectangular outer perimeters.

In certain embodiments the aerosol generating material, for example the aerosol generating gel or film, will be in discrete portions or "dots". Such dots may be heated individually or in sets or groups. Such selective partial heating of the aerosol generating material may allow for control over the type and/or amount of aerosol generated and/or the duration of that generation. Each dot may be present on a discrete region of the support material, as described herein.

In appropriate embodiments, dots of aerosol generating material and/or their corresponding regions of a surface of a support material may be any suitable shape. In certain embodiments, the dots may be substantially circular and may be positioned in a grid or hexagonal packing arrangement. In an alternative embodiment, the dots may be of a shape that can tessellate to cover at least a portion of a surface of a support material, optionally allowing for a "bare" region of said surface between dots, as described herein. Suitable non-circular dots may be square, rectangular or hexagonal in shape, allowing for grid or hexagonal packing of dots over a surface of the support. Other tessellating or substantially tessellating shapes may also be suitable.

Where the aerosol generating material is present in discrete portions, each portion may be any appropriate dimension, mass and/or volume. Typical portions may be, for example, 0.1 to 100 mg (e.g. 1 to 100 mg) of aerosol generating material, such as 1 to 50 or 2 to 25 mg per portion.

The aerosol generating material may have any suitable area density, such as from 30 g/m2 to 120 g/m2. In some embodiments, aerosol generating material may have an area density of from about 30 to 70 g/$m^2$, or about 40 to 60 g/$m^2$. In some embodiments, the aerosol-generating material may have an area density of from about 80 to 120 g/$m^2$, or from about 70 to 110 g/$m^2$, or particularly from about 90 to 110 g/$m^2$.

Suitably, the thickness of the aerosol generating material may be in the range of about 0.05 mm, 0.1 mm or 0.15 mm to about 0.5 mm or 0.3 mm. The inventors have found that a material having a thickness of around 0.2 mm (e.g. 0.18 to 0.22 mm) is particularly suitable. Typical portions may be, for example, 5 mm to 10 cm in largest dimension, such as from around 5 mm, 8 mm or 10 mm, to around 15 mm, 20 mm or 30 mm in largest dimension. Around 13 mm (e.g. 10 to 15 mm) is highly suitable. In certain embodiments, the area of a portion may be between 50 and 200 $mm^2$. This may suitably be between 125 and 150 $mm^2$ (e.g. around 140 $mm^2$, such as 135-145 $mm^2$) or between 60 and 81 $mm^2$.

In some embodiments, an aerosol generating material is attached to a first or second surface of the support and the aerosol generating material is treated with an anti-adhesive agent on at least one surface not attached to said support layer.

As an example, the anti-adhesive agent may comprise minerals such as talc or calcium carbonate, celluloses, starches, lecithin, silicone and/or polytetrafluoroethylene (PTFE) and the like. The anti-adhesive agent is stable (i.e. does not melt, decompose etc.) at the operating temperatures of the assemblies described herein. In an embodiment, the anti-adhesive agent may be talcum powder, powdered calcium carbonate or another powder that may be applied to the surface of the amorphous solid, and which may cover any tackiness and help to prevent adhesion.

In some cases, the consumable may be manufactured in the form of a sheet, which may optionally be held in wound or coiled form, for example during manufacture before cutting into appropriate sizes for final use. The amorphous aerosol generating material described herein, particularly those formed from a gel (optionally by drying a gel e.g. to generate a film) may have tacky surfaces which complicates the handling. Through selecting a combination of aerosol generating material, support layer(s) and optionally the anti-adhesive agent, the aerosol generating material may be prevented from adhering to the reverse surface of the support or backing, thereby improving the handleability during manufacture.

In some cases, the consumable may comprise one or more magnets which can be used to fasten the consumable to a heater (e.g. an induction heater) in use.

In certain embodiments, the consumable item may comprise a support having a support layer in at least partial contact with the aerosol generating material. Such a support layer may be formed of any suitable material including metal, or polymer materials including bio-polymer materials such as cellulose. In certain embodiments, the support layer may be a metal foil such as aluminium foil. Where a support layer is formed of aluminium, the aluminium may have a thickness of between 5 μm to 25 μm. The aluminium thickness may be 7 μm, 10 μm or 20 μm and may be between 6 μm and 8 μm. Metal support layers have the advantage of high thermal conductivity and may act as heaters due to the electrical resistance of the material by passing a current through at least a part of the support layer. Such a current may be generated by a conventional electrical circuit or by electrical induction. In one embodiment, a metal film forming a support layer acts as susceptor for electrical inductive heating of at least a portion of the consumable.

In certain embodiments the support may comprise a support layer, such as a metal foil support layer, and may further comprise a backing layer of a similar of different material. In certain embodiments, the support may comprise a backing layer of a polymer material such as a bio-polymer or synthetic polymer material. Suitable biopolymer materials include polysaccharides including cellulose-based materials such as paper or card. Synthetic polymer materials should have a melting point sufficiently high to retain structural integrity at temperatures employed to heat the aerosol generating material. Such polymers may thus have a melting point above 200° C. or above 250° C. Suitable examples include polyaryletherketones (PAEKs) such as polyether ether ketone (PEEK).

Figure 2:
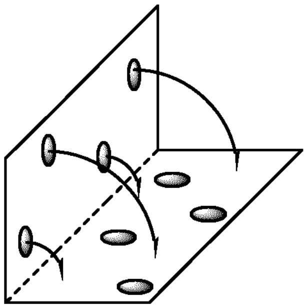
FIG. 2 shows a schematic perspective view of the consumable of FIG. 1 where the consumable is mid-way through the process of folding along the fold line.
Figure 3:
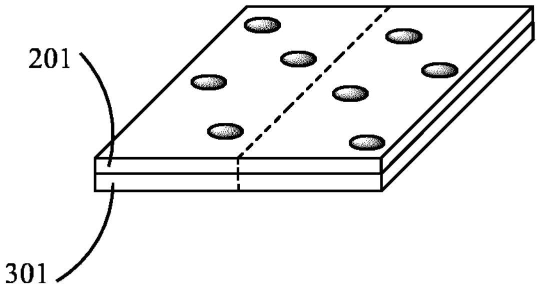
FIG. 3 shows a schematic perspective view of an alternative consumable for use with a non-combustible aerosol provision device where the consumable has two parallel fold lines.

Referring to FIGS. 1 to 2, there is shown a consumable 100 for use with a non-combustible aerosol provision device. The consumable 100 includes a support 101, first surface 102 and second surface 103, separated by a fold line 106. Discrete portions of aerosol generating material 104 and bare areas of surface 105 between such portions are shown. FIG. 2 represents the consumable of FIG. 1 around the mid-point of the process of folding the consumable along the folding line. The arrows represent the path that the portions of aerosol generating material on the first surface will take as the folding process is completed. It can be seen that the discrete portions of aerosol generating material are so-arranged that each portion on the first surface aligns with a bare area on the second surface as the fold is made.

Figure 4:
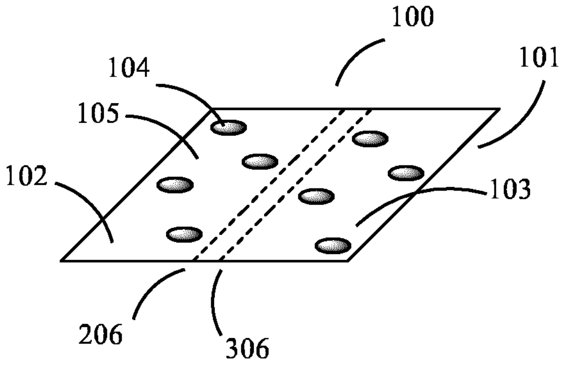
FIG. 4 shows a schematic perspective view of an alternative consumable for use with a non-combustible aerosol provision device wherein the support comprises a support layer and a backing layer.

FIG. 4 represents a further embodiment in which the support is comprised of a support layer 201 and a backing layer 301. The support layer may be a sheet material such as a metal foil (e.g. aluminium foil). The backing layer may be the same or a different material, such as paper, card or PEEK.

Figure 5:
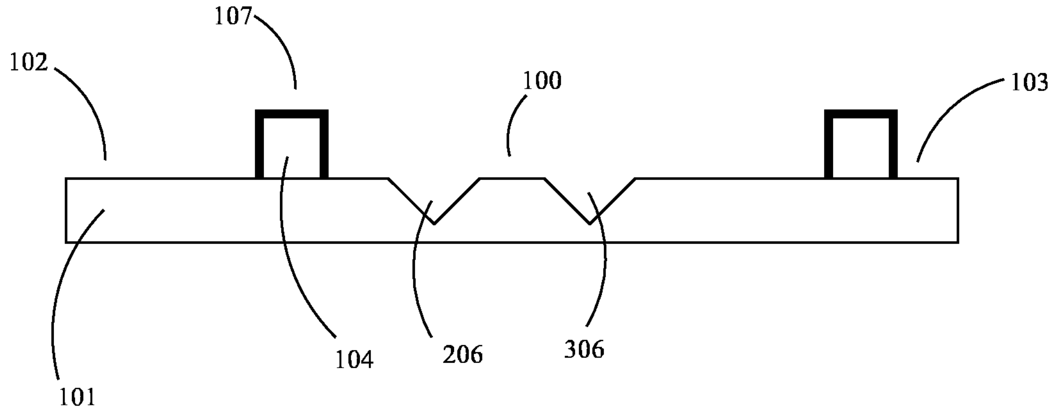
FIG. 5 shows a schematic side-view of a consumable for use with anon-combustible aerosol provision device where the consumable is in an unfolded configuration.
Figure 6:
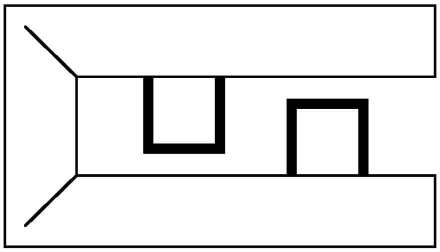
FIG. 6 shows a schematic side-view of the consumable of FIG. 5 in the folded configuration.

FIG. 5 represents an alternative consumable in which two parallel fold lines, 206 and 306 are present. When this consumable is folded, the region between the fold lines acts as a support such that the consumable does not readily flatten. A similar embodiment is illustrated in side-view in FIG. 5 where first and second surfaces 102 and 103 can be seen separated by two fold lines 206 and 306. The fold lines may be scores or other weakened areas in the support to facilitate folding. FIG. 6 illustrates the consumable of FIG. 5 in the folded configuration such that the discrete portions of aerosol generating material on each of the first and second surfaces have aligned with bare areas of the opposing surface.

Figure 7:
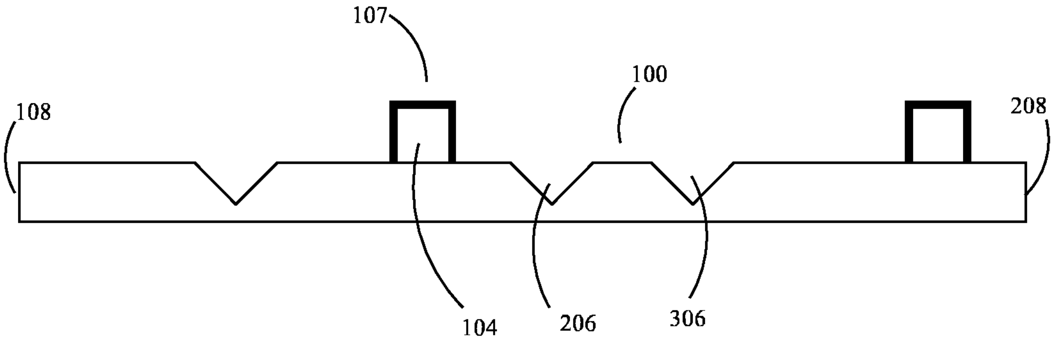
FIG. 7 shows a schematic side-view of a consumable for use with a non-combustible aerosol provision device where the consumable is in an unfolded configuration.
Figure 8:
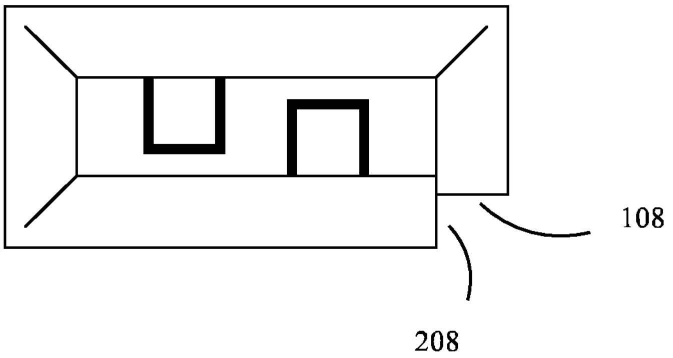
FIG. 8 shows a schematic side-view of the consumable of FIG. 7 in a folded configuration with edges 108 and 208 adjacent.

FIG. 7 shows a side-view of a further embodiment in which the support has a third fold line 406 and two edges 108 and 208. The edges are distance in the open configuration shown in FIG. 7 but are brought adjacent in the folded configuration illustrated in FIG. 8. In this embodiment a "box" type configuration is adopted having openings defined by the folded edges of the support.

Figure 9:
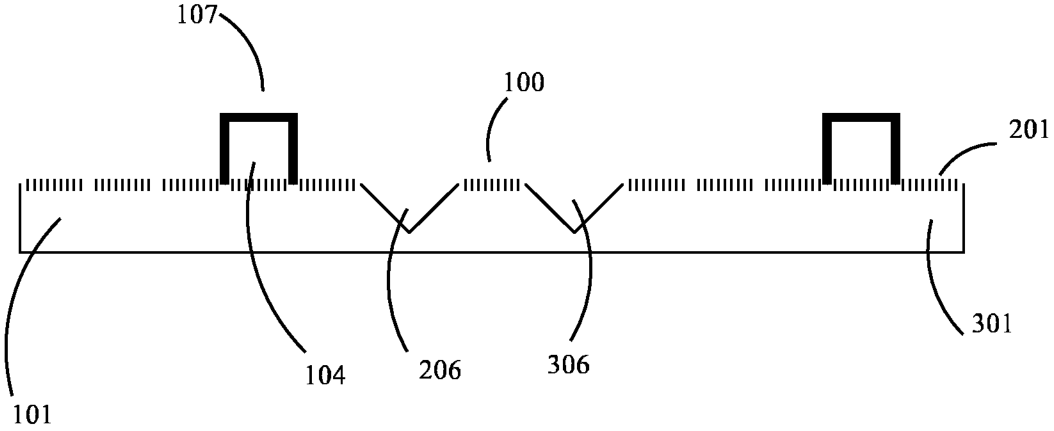
FIG. 9 shows a schematic side-view of a consumable of FIG. 7 in an unfolded configuration wherein the support comprises a foil layer.

FIG. 9 illustrates an embodiment similar to that shown in FIG. 6 but wherein the support comprises a support layer 201, which may be, for example a metal foil, such as aluminium foil, and a backing layer 301.

FIG. 10 illustrates two embodiments in which the support has at least one curved surface. In 10A, support 101 is in the form of a tube with circular cross-section and portions of aerosol generating material 104 are supported on the single inside surface 102. The portions are so positioned that portions of aerosol generating material 104 upstanding from one side of the surface fall into bare areas between portions of aerosol generating material supported on the opposite side of the tube. FIG. 10B shows a similar embodiment but with the support in the form of a tube with digonal cross-section with fold-lines at the vertices of the digon and two inside surfaces 102 and 103. Portions of aerosol generating material 104 upstanding from one inside surface fall into bare areas between portions supported on the opposing surface.

FIG. 11 illustrates a cross-section of a consumable 100 having a folded configuration. Support 101 is folded such that portions of aerosol generating material "interdigitate" with portions supported on first surface 102 falling into bare areas of second surface 103. In such a configuration, the portions 104 are separated such that they do not stick to each other but all portions of aerosol generating material are protected by being on the "inside" of the fold with only the support 101 exposed at "outside".

FIG. 12 illustrates a stack of the consumables 100 illustrated in FIG. 11. Such "folded" consumables can readily be stacked for packaging or storage because the portions of aerosol generating material are protected by being present on the inside surfaces of the folded support. The interdigitated configuration avoids the portions of aerosol generating material on opposite surfaces sticking to each other but provides a compact and efficient storage method. The consumables may be removed from the stack for use and used folded or in a fully or partially unfolded configuration.

FIG. 13 illustrates a "fan fold" consumable in which the support 101 is folded to give multiple sections of consumable. Each surface (102, 103, 202, 203) is separated by a frangible region 109, 209. In use the consumable is divided at a frangible region and used either as a single surface with supported aerosol generating material or as a pair of surfaces (e.g. 102 and 103) which may be used in the folded configuration shown or in a fully or partially unfolded configuration.

The examples above illustrate the invention using embodiments with an aerosol generating material on a first and/or second surface of a support. However, in other examples the support may include depressions in which certain discrete portions of aerosol generating material may be contained.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

Definitions

According to the present disclosure, a "non-combustible" aerosol provision system is one where a constituent aerosol-generating material of the aerosol provision system (or component thereof) is not combusted or burned in order to facilitate delivery of at least one substance to a user.

In some embodiments, the non-combustible aerosol provision system is an electronic cigarette, also known as a vaping device or electronic nicotine delivery system (END), although it is noted that the presence of nicotine in the aerosol-generating material is not a requirement.

In some embodiments, the non-combustible aerosol provision system is an aerosol-generating material heating system, also known as a heat-not-burn system. An example of such a system is a tobacco heating system.

Typically, the non-combustible aerosol provision system may comprise a non-combustible aerosol provision device and a consumable, such as those disclosed herein, for use with the non-combustible aerosol provision device.

In some embodiments, the disclosure relates to consumables comprising aerosol-generating material and configured to be used with non-combustible aerosol provision devices.

In some embodiments, the non-combustible aerosol provision system, such as a non-combustible aerosol provision device thereof, may comprise a power source and a controller. The power source may, for example, be an electric power source or an exothermic power source. In some embodiments, the exothermic power source comprises a carbon substrate which may be energised so as to distribute power in the form of heat to an aerosol-generating material or to a heat transfer material in proximity to the exothermic power source.

In some embodiments, the non-combustible aerosol provision system may comprise an area for receiving the consumable, an aerosol generator, an aerosol generation area, a housing, a mouthpiece, a filter and/or an aerosol-modifying agent.

In some embodiments, the consumable for use with the non-combustible aerosol provision device may, where technically compatible, comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

The active constituent as used herein may be a physiologically active material, which is a material intended to achieve or enhance a physiological response. The active constituent may for example be selected from nutraceuticals, nootropics, psychoactives. The active constituent may be naturally occurring or synthetically obtained. The active constituent may comprise for example nicotine, caffeine, taurine, theine, vitamins such as B6 or B12 or C, melatonin or combinations thereof. The active constituent may comprise one or more constituents, derivatives or extracts of tobacco, cannabis or another botanical. In one embodiment the botanical may be cannabis and/or the active constituent may be cannabinoids, or constituents or derivatives thereof, optionally in combination with other physiologically active agents.

In some embodiments, the active constituent comprises nicotine.

In some embodiments, the active constituent comprises caffeine, melatonin or vitamin B12.

As noted herein, the active constituent may comprise one or more constituents, derivatives or extracts of cannabis, such as one or more cannabinoids or terpenes.

Cannabinoids are a class of natural or synthetic chemical compounds which act on cannabinoid receptors (i.e., CB1 and CB2) in cells that repress neurotransmitter release in the brain. Cannabinoids may be naturally occurring (phytocannabinoids) from plants such as cannabis, from animals (endocannabinoids), or artificially manufactured (synthetic cannabinoids). *Cannabis* species express at least 85 different phytocannabinoids, and are divided into subclasses, including cannabigerols, cannabichromenes, cannabidiols, tetrahydrocannabinols, cannabinols and cannabinodiols, and other cannabinoids. Cannabinoids found in cannabis include, without limitation: cannabigerol (CBG), cannabichromene (CBC), cannabidiol (CBD), tetrahydrocannabinol (THC), cannabinol (CBN), cannabinodiol (CBDL), cannabicyclol (CBL), cannabivarin (CBV), tetrahydrocannabivarin (THCV), cannabidivarin (CBDV), cannabichromevarin (CBCV), cannabigerovarin (CBGV), cannabigerol monomethyl ether (CBGM), cannabinerolic acid, cannabidiolic acid (CBDA), Cannabinol propyl variant (CBNV), cannabitriol (CBO), tetrahydrocannabmolic acid (THCA), and tetrahydrocannabivarinic acid (THCV A).

As noted herein, the active constituent may comprise or be derived from one or more botanicals or constituents, derivatives or extracts thereof. As used herein, the term "botanical" includes any material derived from plants including, but not limited to, extracts, leaves, bark, fibres, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed pconsumables, granules, pellets, shreds, strips, sheets, or the like. Example botanicals are tobacco, eucalyptus, star anise, hemp, cocoa, fennel, lemongrass, peppermint, spearmint, rooibos, chamomile, flax, ginger, ginkgo biloba, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, ginseng, theanine, theacrine, maca, ashwagandha, damiana, guarana, chlorophyll, baobab or any combination thereof. Cannabis forms a further botanical which may be used alone or in combination with at least one other.

Where present, the mint may be chosen from the following mint varieties: *Mentha arvensis, Mentha* c.v., *Mentha niliaca, Mentha piperita, Mentha piperita citrata* c.v., *Mentha piperita* c.v., *Mentha spicata crispa, Mentha cordifolia, Mentha longifolia, Mentha suaveolens variegata, Mentha pulegium, Mentha spicata* c.v. and *Mentha suaveolens*.

In some embodiments, the botanical is selected from eucalyptus, star anise, cocoa and hemp.

In some embodiments, the botanical is selected from rooibos and fennel.

As used herein, the terms "flavour" and "flavourant" refer to materials which, where local regulations permit, may be used to create a desired taste, aroma or other somatosensorial sensation in a product for adult consumers. They may include naturally occurring flavour materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus *Mentha*, eucalyptus, star anise, cocoa, lemongrass, rooibos, flax, ginkgo biloba, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavour enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas.

The flavour may suitably comprise one or more mint-flavours suitably a mint oil from any species of the genus *Mentha*. The flavour may suitably comprise, consist essentially of or consist of menthol.

In some embodiments, the flavour comprises menthol, spearmint and/or peppermint.

In some embodiments, the flavour comprises flavour components of cucumber, blueberry, citrus fruits and/or redberry.

In some embodiments, the flavour comprises eugenol.

In some embodiments, the flavour comprises flavour components extracted from tobacco.

In some embodiments, the flavour comprises flavour components extracted from cannabis.

In some embodiments, the flavour may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucalyptol, WS-3.

As used herein, the term "aerosol forming material" refers to an agent that promotes the generation of an aerosol. An aerosol forming material may promote the generation of an aerosol by promoting an initial vaporisation and/or the condensation of a gas to an inhalable solid and/or liquid aerosol.

Suitable aerosol forming materials include, but are not limited to: a polyol such as erythritol, sorbitol, glycerol, and glycols like propylene glycol or triethylene glycol; a non-polyol such as monohydric alcohols, high boiling point hydrocarbons, acids such as lactic acid, glycerol derivatives, esters such as diacetin, triacetin, triethylene glycol diacetate, triethyl citrate or myristates including ethyl myristate and isopropyl myristate and aliphatic carboxylic acid esters such as methyl stearate, dimethyl dodecanedioate and dimethyl tetradecanedioate. The aerosol forming material may suitably have a composition that does not dissolve menthol. The aerosol forming material may suitably comprise, consist essentially of or consist of glycerol.

As used herein, the term "tobacco material" refers to any material comprising tobacco or derivatives thereof. The term "tobacco material" may include one or more of tobacco, tobacco derivatives, expanded tobacco, reconstituted tobacco or tobacco substitutes. The tobacco material may comprise one or more of ground tobacco, tobacco fibre, cut tobacco, extruded tobacco, tobacco stem, reconstituted tobacco and/or tobacco extract.

The tobacco used to produce tobacco material may be any suitable tobacco, such as single grades or blends, cut rag or whole leaf, including Virginia and/or Burley and/or Oriental. It may also be tobacco pconsumable 'fines' or dust, expanded tobacco, stems, expanded stems, and other processed stem materials, such as cut rolled stems. The tobacco material may be a ground tobacco or a reconstituted tobacco material. The reconstituted tobacco material may comprise tobacco fibres, and may be formed by casting, a Fourdrinier-based paper making-type approach with back addition of tobacco extract, or by extrusion.

All percentages by weight described herein (denoted wt %) are calculated on a dry weight basis, unless explicitly stated otherwise. All weight ratios are also calculated on a dry weight basis. A weight quoted on a dry weight basis refers to the whole of the extract or slurry or material, other than the water, and may include components which by themselves are liquid at room temperature and pressure, such as glycerol. Conversely, a weight percentage quoted on a wet weight basis refers to all components, including water.

When a material, such as a gel, is referred to herein as "dried" this indicates that the material is at least functionally dry such that it does not flow as a fluid. Dried may indicate that substantially all of the water is removed but in many cases a certain amount may remain and thus a material may be dried and contain less than 10% water (e.g. 0.01 to 10%), preferably less than 5%, more preferably less than 1% water by weight. Partially dried may indicate, for example, that at least half of the initial water content is removed.

For the avoidance of doubt, where in this specification the term "comprises" is used in defining the invention or features of the invention, embodiments are also disclosed in which the invention or feature can be defined using the terms "consists essentially of" or "consists of" in place of "comprises". Reference to a material "comprising" certain features means that those features are included in, contained in, or held within the material.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A consumable for use with a non-combustible aerosol provision device, in which the consumable comprises a support and aerosol generating material, the support has at least one curved or at least two substantially flat surface(s) wherein:

the aerosol generating material comprises two or more discrete portions of aerosol generating material each supported on at least one surface of the support and with each of the portions separated from at least one other portion by a bare area of surface of the support;

at least two discrete portions of the aerosol generating material are upstanding from the respective surface of the support upon which they are supported;

the support is configured by the shape of at least one curved face and/or by folding about a fold line between two faces so that at least one part of a first surface of the support faces toward at least a part of the same or another surface of the support;

the discrete portions of aerosol generating material are so located on the surface(s) of the support that, each discrete portion of aerosol generating material upstanding from the surface of the support falls into a bare area of the surface of the support between or adjacent to portions of aerosol generating material.

2. The consumable as claimed in claim 1 wherein the discrete portions of aerosol generating material are so located that adjacent discrete portions of aerosol generating material are spaced from each other.

3. The consumable as claimed claim 1 wherein the support has a first edge and a second edge and at least one fold line and folding of the support along at least one fold line brings the first edge and the second edge adjacent.

4. The consumable as claimed in claim 3 wherein the support further comprises a means to latch the first edge of the support adjacent the second edge of the support when the support is folded about the fold line.

5. The consumable as claimed in claim 1 wherein the discrete portions of aerosol generating material are so located that they define a number of passageways that extend between at least two openings where each opening is defined by at least one edge of the support.

6. The consumable as claimed in claim 1 wherein the support comprises at least two parallel fold lines spaced from each other.

7. The consumable of claim 1 wherein the support comprises at least one susceptor.

8. The consumable of claim 7 wherein the susceptor comprises a sheet material.

9. The consumable of claim 8 wherein the susceptor comprises a metal foil such as aluminium foil.

10. The consumable of claim 1 wherein the support comprises a support layer and a backing layer, wherein the support layer forms at least one surface upon which the discrete portions of aerosol generating material are supported.

11. The consumable of claim 10 wherein the support layer forms a susceptor.

12. The consumable of claim 10 wherein the backing layer is a polymer material such as paper, card or a polyaryletherketone.

13. The consumable of claim 1 wherein the discrete portions of the aerosol generating material are supported in a grid pattern.

14. The consumable of claim 1 wherein at least two discrete portions of the aerosol generating material have different compositions from each other.

15. The consumable of claim 14 wherein each discrete portion is of a shape and/or colour that is indicative of the composition of the aerosol generating material forming the discrete portion.

16. A consumable of claim 1 having at least one frangible region, such as at least one line of perforations.

17. A consumable of claim 16 which can be broken or torn along a frangible region to allow use of a part of the consumable.

18. A non-combustible aerosol provision system comprising a non-combustible aerosol provision device and a consumable for use with the non-combustible aerosol provision device, in which the consumable is as claimed in claim 1.

19. A kit comprising a non-combustible aerosol provision device; and a consumable for use with the non-combustible aerosol provision device, in which the consumable is as claimed in claim 1.

20. A method of manufacturing a consumable for use with a non-combustible aerosol provision device, the method comprising:

providing a support having at least one curved or at least two substantially flat surfaces, providing at least two discrete portions of aerosol generating material with each supported on at least one surface of the support and with each of the portions separated from at least one other portion by a bare area of surface of the support, where at least two portions of the aerosol generating material are upstanding from the respective surface of the support upon which they are supported, the portions of aerosol generating material being applied in locations on the support such that each discrete portion of aerosol generating material upstanding from the support extends into a bare area of the surface of the support between or adjacent to portions of aerosol generating material.

* * * * *